March 5, 1935.  E. C. GOEBERT  1,993,161
WELDED JOINT STRUCTURE
Filed Nov. 4, 1932
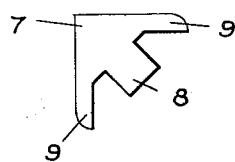
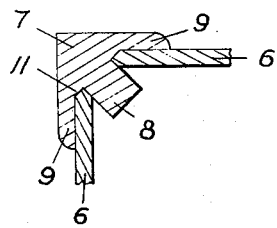
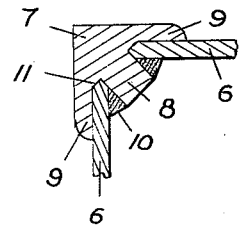
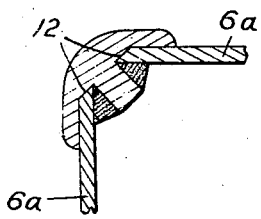
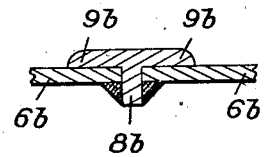
Inventor
Elmer C. Goebert
By W. N. Roach
Attorney Patented Mar. 5, 1935

1,993,161

UNITED STATES PATENT OFFICE 1,993,161

WELDED JOINT STRUCTURE

Elmer C. Goebert, United States Army, Philadelphia, Pa.

Application November 4, 1932, Serial No. 641,192

1 Claim. (Cl. 189—36)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a welded joint structure.

In uniting two members by means of a welding operation, the heat applied to the members tends to destroy the temper of the metal. The purpose of this invention is to provide a welding strip having one element entering into the formation of the joint and another element serving to reinforce the marginal portions of the united members.

To these and other ends, the invention consists in the construction, arrangement and combination of elements described hereinafter and pointed out in the claim forming a part of this specification.

A practical embodiment of the invention is illustrated in the accompanying drawing wherein:

Fig. 1 is an end view of the improved welding strip.

Fig. 2 is a sectional view of a joint to be welded.

Fig. 3 is a similar view of the welded joint.

Figs. 4 and 5 are modifications further illustrating the principles of the invention.

Referring to Figs. 1 to 3, the members 6—6 that are to be united are maintained in an appropriately spaced relation at a predetermined angle by means of a welding strip 7.

The strip 7 consists of a central rib or stem 8 and flanges 9—9 whose angular relation to the stem determines the angularity of the joint. The angular relation between the stem and flanges is preferably not in excess of ninety degrees so that the stem projects into the inside angle between the members 6 and the flanges will bear against the outer side of the members.

The welding material 10 is placed between the stem 8 and the members 6. In performing the welding operation the heat applied tends to destroy the temper of the marginal portions of the members 6. Due to the conduction of heat the affected area will extend beyond the welding material 10. The width of the flanges 9 is determined by the extent of the affected area which varies a determinable amount according to the character and thickness of the metal. In any event the flange should extend well beyond the welding material 10 in order to reinforce the side members and provide a strong joint.

In Fig. 3 the members 6 are shown with a double beveled edge 11 while in the modification of Fig. 4 the members 6a have a single beveled edge 12.

In Fig. 5 the members 6b are in the same plane and the stem 8b is perpendicular to the flanges 9b.

I claim:

In a joint structure, two members to be joined, a uniting strip having a stem insertable between the members and projecting beyond said members, welding material between the projecting portion of the stem and the members, and flanges on the strip bearing on the side of the members opposite to the welding material and extending beyond said welding material and over an area whose temper has been affected by the welding operation.

ELMER C. GOEBERT.